United States Patent Office 3,244,584
Patented Apr. 5, 1966

3,244,584
HIGH MOLECULAR WEIGHT COPOLYMERS OF UNSATURATED ALDEHYDES AND PROCESS FOR PREPARING PAPER THEREWITH
Alva T. Stewart, Jr., Berkeley, and William H. Houff, Walnut Creek, Calif., assignors to Shell Oil Company, New York, N.Y., a corporation of Delaware
No Drawing. Filed Dec. 30, 1960, Ser. No. 79,482
12 Claims. (Cl. 162—168)

This invention relates to new copolymers and their preparation. More particularly, the invention relates to new high molecular weight copolymers of unsaturated aldehydes, to their preparation and to their utilization, particularly for the treatment of paper.

Specifically, the invention provides new and particularly useful copolymers comprising the product of polymerization of a mixture of an unsaturated aldehyde, and preferably acrolein, with an ethylenically unsaturated monomer containing a basic nitrogen atom, and preferably a basic nitrogen atom, such as N-vinylpyridine. The invention further provides a new process for preparing the above-decribed copolymers.

As a special embodiment, the invention provides new and valuable water soluble derivatives of the above-described copolymers obtained by treating the said polymers with a water solubilizing agent, such as sulfur dioxide or sodium bisulfite. As a further special embodiment, the invention provides a method for utilizing these water soluble high molecular weight copolymers and the treatment of paper to impart unexpected high wet strengths and improved dimensional stability.

As a further embodiment, the invention provides new and useful solvent soluble derivatives for the above-noted high molecular weight copolymers.

It is known that unstabilized acrolein changes spontaneously into a solid insoluble polymer known as "disacryl." The same insoluble polymer can also be obtained by heating acrolein to high temperatures in the presence of peroxides. These insoluble polymers have never acquired any technical importance chiefly because of their thermosetting nature and their low molecular weight.

It is an object of the invention to provide new polymers of unsaturated aldehydes, such as acrolein. It is a further object to provide new copolymers of unsaturated aldehydes which have high molecular weights. It is a further object to provide new copolymers of unsaturated aldehydes which are thermoplastic and can be molded to form valuable plastic products. It is a further object to provide an efficient process for preparing high molecular weight thermoplastic polymers of acrolein. It is a further object to provide new water soluble and solvent soluble derivatives of high molecular weight aldehyde copolymers. It is a further object to provide new water insoluble high molecular weight copolymers of unsaturated aldehydes which are particularly useful and valuable in industry. It is a further object to provide water soluble products which are particularly useful for treating paper. These and other objects of the invention will be apparent from the following detailed description thereof.

It has now been discovered that these and other objects may be accomplished by the new copolymers of the invention comprising the product of polymerization of an unsaturated aldehyde and preferably acrolein with an ethylenically unsaturated monomer containing nitrogen, and preferably a basic nitrogen atom. It has been found that these particular copolymers can be converted to water soluble derivatives which are particularly useful and valuable as wet strength agents for paper. When applied in aqueous systems to paper, the new copolymers react therewith to give paper products having unexpectedly high wet strength values. Evidence of the superior properties of the new water soluble derivatives in this application is shown in the working examples at the end of the specification.

It has also been found that the above-described copolymers can be converted to valuable solvent soluble derivatives which are particularly useful for the preparation of films, coatings, moldings and the like.

The alpha,beta-ethylenically unsaturated aldehydes used in making the new polymers comprise those monoaldehydes having an ethylenic group in an alpha,beta-position relative to the aldehyde group, such as, for example, acrolein and alpha and beta-substituted acroleins, as methacrolein, alpha-ethylacrolein, alpha-butylacrolein, alpha-chloroacrolein, beta-phenylacrolein, alpha-decylacrolein, alpha-cyclohexylacrolein and the like. Preferred aldehydes to be employed in making the copolymers include the alpha,beta-monoethylenically unsaturated monoaldehydes containing from 3 to 12 carbon atoms, and especially acrolein and the alpha- and beta-substituted acroleins where the substituent on the alpha and/or beta-positions is an alkyl, cycloalkyl or aryl group containing no more than 8 carbon atoms. 2-Alkenals containing up to 8 carbon atoms come under special consideration.

The monomers containing the nitrogen may be exemplified by the following methacrylamide, N-(dimethylaminoethyl)acrylamide, beta-diethylaminoethyl methacrylate, beta-vinyloxyethylamine, N-beta-vinyloxyethyl formamide, dimethylamino-methyl-styrene, methylallylamine, diallylamine, N-vinyl-2-pyrrolidone, 2-vinylpyridine, 2-methyl-5-vinylpyridine, 5-methyl-2-vinylpyridine, 3-ethyl-5-vinylpyridine, 5-butyl-2-vinylpyridine, 2,3,4-trimethyl-5-vinylpyridine, 2-isopropenylpyridine, 5-propyl-2-isopropenylpyridine, 2-octyl-5-vinylpyridine, 5-dodecyl-2-vinylpyridine, 2-vinylquinoline; 8-ethyl-2-vinylquinoline, 4-hexyl-5-vinylquinoline; 1-vinylisoquinoline and 5-methyl-1-isopropenylisoquinoline. Other examples include beta-diethylaminoethyl acrylate, N-phenylmethacrylamide, N-(beta-vinyloxyethyl)formamide, beta-methacryloxyethyldimethylammonium stearate, 4-dimethylaminocyclohexyl methacrylate, 4-dimethylaminocyclohexyl methacrylamide, beta-dicyclohexylaminoethyl methacrylate, beta-dibutylaminoethyl methacrylate, dimethylaminomethylstyrene and the like, and mixtures thereof.

Preferred nitrogen-containing monomers to be employed include the vinylpyridines, such as pyridines having the vinyl group attached to ring carbon or the ring nitrogen atom, and the lower alkyl (less than 7 carbon atoms) substituted vinylpyridines. Also preferred are the allylic amines, the vinylpyrrolidones, the amides of monoethylenically unsaturated carboxylic acids, and the esters of unsaturated monocarboxylic acids and nitrogen-substituted alcohols, such as the alkyl, cycloalkyl and aryl substituted aminoalkyl and aminocycloalkyl esters of alkenoic acids said amides and esters containing no more than 18 carbon atoms.

Coming under special consideration are the N-substituted amides of carboxylic acids which preferably contain a polar group, as a —OH, —COOH,

—SH, —NR$_2$ and

wherein R is hydrogen or hydrocarbon radical in the substituent on the nitrogen, such as, for example, N-butanol methacrylamide, N-hexanol methacrylamide, N-(3-aminopropyl)methacrylamide, N-(6-mercaptooctyl) acrylamide, N,N-di(methylaminoethyl)itaconamide and the like, and mixtures thereof.

The amount of the unsaturated aldehyde and the nitrogen-containing monomer to be employed making the new copolymers may vary within certain limits. The amount of the unsaturated aldehyde should be at least 5% by weight of the mixture and preferably no more than 99.5% by weight of the mixture. Copolymers having particularly outstanding properties especially as to solubility of the $SO_2$ derivative and reactivity with other material are obtained when the amounts of the unsaturated aldehyde vary from 55% to 99% by weight of the mixture of monomers. In some cases, it may be desirable to replace a portion of the nitrogen-containing monomer with a dissimilar monomer. Examples of such other monomers include styrene, allyl alcohol, acrylic and methacrylic acids and their allyl esters, vinyl acetate, monoolefins, allyl esters of monocarboxylic acids, diolefins, vinyl halides, and the like and mixtures thereof. These third monomers preferably make up from 1% to 50% by weight of the monomers being polymerized.

The new copolymers of the invention are preferably prepared by polymerizing the monomers in an aqueous system using a free radical catalyst and reducing agent and preferably at low reaction temperatures. Examples of free radical yielding catalysts that may be employed include, among others, peroxides, such as benzoyl peroxide, hydrogen peroxide, potassium persulfate, potassium permangate, methyl cyclohexyl peroxide, alkali perborates, diacetyl peroxide, tertiary butylhydroperoxide, tertiary amyl hydroperoxide, ditertiary butyl peroxide, ditertiary hexyl peroxide, acetyl benzoyl peroxide, cumene hydroperoxide, tetralin hydroperoxide, phenylcyclohexane hydroperoxide, tertiary-butylisopropyl benzene hydroperoxide, tertiary butyl peracetate, tertiary butyl perbenzoate, ditertiary butyl phthalate, ditertiary butyl peradipate, tertiary butyl percarbonate and the like. Particularly preferred free radical yielding catalysts include the peroxides, such as the dialkyl peroxides, diaryl peroxides, tertiary alkyl hydroperoxides, alkyl peresters of percarboxylic acids, and particularly those of the above-noted groups which contain not more than 18 carbon atoms per molecule.

The above-described free radical yielding catalysts are employed in small amounts, the exact amount being dependent upon the particular type selected. In general, the amount of catalyst used will vary from about $1 \times 10^{-2}$ to about $2 \times 10^{-5}$ mols per mol of unsaturated monomer to be polymerized. Preferred amounts vary from about $1 \times 10^{-3}$ to $1 \times 10^{-4}$ mols per mol of material being polymerized.

The material employed with the above-described free radical yielding catalyst may be of any of the various types of reducing agents. Examples of these include the organic sulfur compounds, such as sulfinic acids or their salts, alpha-oxysulfones, sulfoxylates, alpha-amminosulfones, thioethers which are preferably substituted by a hetero atom such as nitrogen in alpha position, or mercaptans with the simultaneous presence of labile halogen, mono or polyvalent aliphatic alcohols, beta-mercaptoethanol, levulinic acid, sterol compounds, dicyandiamidine, thiobarbituric acid, sulfur dioxide or water-soluble sulfur compounds, and particularly the sulfur dioxide or bisulfite derivatives of previously formed polymers of acrolein. Especially preferred reducing agents to be employed include the sulfur dioxide products of polyacroleins having an I.V. of at least 0.3 dl./g. and prepared by polymerizing acrolein in a redox catalyst system as described for the preparation of the copolymers of the present invention.

Salts of multivalent metals may also be used as reducing agents in the present process, but their presence is less preferred than the above-described types. By multivalent metal is meant one that can change its valency state reversibly. Examples of such metals include, among others, iron, manganese, copper, vanadium, cobalt, nickel, tin, silver, titanium, etc. When added to the reaction mixture, the metal must be at least in part in a lower valency state such as, for example, ferrous chloride, silver nitrate, titanium dichloride, cobaltous chloride, ferrous pyrophosphate, potassium ferrocyanide, manganous sulfate, ferrous sulfate, and the like. The anion portion of the metal salt may be of any type as long as the resulting salt has the necessary solubility in the reaction medium.

Particularly good results are obtained when an anti-coalescent agent is included in the reaction mixture. The presence of such materials brings about an increase in rate of copolymerization and maintenance of molecular weight. The agent may be a cationic, anionic or non-ionic material and have a great variety of different compositions. Prefered materials include the ionic agents and especially those having a polar structure including a hydrophilic (predominantly hydrocarbon) residue and a charged (ionic) radical thereon, such as anionic surface active compounds including alkali metal and nitrogen-base soaps of higher fatty acids, such as potassium, and sodium myristate, laurate, palmitate, oleate, stearate, ammonium stearate, etc., as well as the surface-active compounds of the cation-active variety, such as salts of long-chain aliphatic amines and quaternary ammoinum bases, such as lauryl amine hydrochloride, stearyl amine hydrochloride, palmityl amine hydrobromide. Additional examples of suitable ionic surface-active agents include the alkali metal or ammonium alkyl or alkylene sulfates or sulfonates, such as sodium and/or potassium lauryl sulfate, alkyl, aryl and alkylated arylsulfonates, cetyl sulfonate, oleylsulfonate, stearylsulfonate, sulfonated Turkey red oil, sulfonated mineral oils, sodium, potassium and ammonium isopropyl naphthalene sulfonate, amine substituted alcohols, sulfonated fatty esters and amides, the hydrochloride of diethyl aminoethyloleylamide, trimethylcetyl ammonium methyl sulfate, alkanesulfonic acids, alkali metal and ammonium salts of sulphonated long-chain hydrocarbons, or sulphonated long-chain fatty acids, such as sulphonated oleic acid and the sodium, potassium and ammonium salts of sulphonated cetyl alcohol.

Also prefered are the non-ionic surface active agents, i.e., those which are not salts and are not subject to ionization when added to water. Examples of these agents include, among others, partial esters of polyhydric alcohols and saturated or unsaturated fatty acids and preferably fatty acids containing at least 10 and more preferably from 12 to 18 carbon atoms, and hexitans and hexitides such as sorbitan or mannitan monolaurate, monopalmitate, monostearate, monooleate or the monoesters of coconut oil fatty acids and the like products described in U.S. 2,322,820. Other examples of partial esters of this type include the pentaerythritol mono- and dipalmitate, pentaerythritol mono- and distearate, pentaerythritol mono- and dioleate, 1,2,6-hexanetriol mono- and dicaproate, 1,2,6-hexanetriol mono- and dioleate, trimethylolpropane distearate, trimethylolpropane dilaurylate, polyglycerol dilaurate, inositol monolaurate, glucose monostearate, sucrose monooleate, polyglycol monooleate, polyglycol monostearate, and the like.

Examples of other suitable non-ionic agents include the hydroxypolyoxyalkylene ethers of the above-described partial esters. Specific examples of this include, among others, the polyethylene glycol ethers of sorbitan or mannitan monolaurate, monopalmitate, monooleate or monostearate. Other examples include the polyethylene glycol ethers or pentaerythritol mono- and dipalmitate, pentaerythritol mono- and distearate, trimethylolpropane distearate, polyglycerol dilaurate, inositol monolaurate and the like.

Other examples include the hydroxypolyoxyalkylene ethers of phenols, such as the reaction product of ethylene oxide and/or propylene oxide and phenols as phenol, bisphenol-A, resorcinol, and the like, and mixtures thereof.

Other examples include di- and monoethers or polyhydric compounds and particularly the polyalkylene glycols. Especially preferred are the aryl and alkaryl polyethylene glycol ethers, such as phenyl polyethylene glycol monoether, xylylpolyethylene glycol monoether, alkyl phenyl polyalkylene glycol ethers, such as nonyl phenyl polyethylene glycol ether, isopropylphenyl polyethylene glycol monoether and the like.

The monomers to be polymerized may be added altogether at the beginning of the reaction or one or more of the monomers may be added in large amounts or in incremental proportions during the course of the reaction. If there is considerable difference in the rate of polymerization of the monomers, it is preferred to add the monomer which is consumed the fastest in small increments during the course of the polymerization reaction.

The temperature employed in the process may vary over a considerable range. It is generally preferred to employ relatively low temperatures. In general, temperatures will vary from the freezing point of the reaction mixture to about 50° C. Preferred temperatures range from about 0° C. to 45° C. Atmospheric, superatomspheric or subatmospheric pressures may be utilized as desired.

The polymerization is preferably effected in an inert atmosphere. This may be preferably accomplished by passing inert gases, such as nitrogen, methane, etc., into and through the reaction mixture. It is also preferred to distill the monomers under nitrogen before use in the process.

The process may be conducted batchwise or on a semicontinuous or continuous scale.

In some cases, the reaction mixture will remain as a latex-like dispersion. If this is the case, the product may be used as such as in applications as surface coatings, treatment of textiles, paper and the like, or the copolymer may be recovered by coagulation with acids, acetone and the like. In other cases, the copolymers will precipitate out as white solids and may be easily recovered by any suitable means, such as filtration, centrifugation and the like. After recovery, it is generally desirable to wash the copolymer with water and/or acetone and then dry the product.

The copolymers may also be prepared by other techniques such as use of high energy ionizing radiation as well as use of saturated salt solutions with peroxide catalysts and the like.

The copolymers of the present invention are solid substantially white high molecular weight products. They preferably have intrinsic viscosities (as determined on the water solubilized form) of at least 0.1 and preferably 0.3 to 5.0 dl./g. The values are determined by the conventional technique of polyelectrolyte viscosity measurements at 25° C. On a mol weight basis, such polymers have molecular weights ranging from about 5,000 to about 3,000,000 as determined by the light scattering technique.

The new copolymers are also characterized by the fact that they contain free aldehyde groups or potentially free aldehyde groups. They also contain nitrogen and preferably basic nitrogen. The copolymers are insoluble in water. Many are insoluble in conventional solvents, such as benzene, toluene and acetone. Some copolymers, and particularly those that are low in aldehyde content, are more soluble.

Those copolymers which tend to be insoluble in solvents tend to be swollen by acetone but do not dissolve therein. These polymers may be dissolved by reaction with materials, such as alcohols, mercaptans and the like.

The above-described new copolymers are thermoplastic and may be molded at high temperatures to form plastic articles. Temperatures used in the molding vary from about 90° C. to 300° C. and preferably between 100° C. and 250° C. Pressures employed in the molding may vary from about 3,000 p.s.i. and about 25,000 p.s.i. The moldings are usually transparent and flexible and can be used for a variety of plastic products, such as combs, pencils, etc.

The water-soluble derivatives of the new high molecular weight copolymers may be obtained by a variety of methods. They are preferably prepared by suspending the high molecular weight polymer in an aqueous solution containing the water-solubilizing agent, such as, for example, sulfur dioxide or an alkali bisulfite, such as sodium bisulfite. The amount of the polymer added will vary depending on the particular agent involved and the concentration of the agent. In general, it is preferred to add from 1 to 50 parts of the polymer per 100 parts of water. The concentration of the solubilizing agent will generally vary from about 1% to about 25%. Stirring and heating may be applied to assist in the dissolution. Temperatures employed will generally vary from about 20° C. to about 90° C. Various means, such as addition of small amounts of acid catalyst or the addition of swelling agents as acetone, tetrahydrofuran may also be employed to assist in the dissolution.

The water-soluble derivatives will have substantially the same molecular weight as the water-insoluble basic copolymer. In the case of the sulfur dioxide and bisulfite, the polymer will also contain a plurality of free sulfonic or sulfate groups or water-soluble salt sulfonate groups contained in the polymer molecule and therefore may be regarded as polymeric polysulfonic acids and polymeric polysulfonates metal salts.

The water solubilized polymers may be used for a great many applications. As water solutions, they may be used in the formation of films, threads, treatment of animal skins, and the like, and as coatings for various materials as wood, metal and the like.

The copolymers solubilized with alkali bisulfites and aqueous sulfur dioxide have been found to be particularly useful as wet strength agents for paper. In this application, the polymers may be applied during the beater stage or as an after-treatment for the paper. Preferably the aqueous solution of the polymer is added during the beater stage when the suspension of paper pulp is being rapidly agitated. This addition may be at the beginning of the beater operation or intermittently or at the end of the operation. If the aqueous solution is applied to the finished paper, it may be added by spraying, or by rollers or by dipping or running the paper through the conventional padding apparatus.

After the aqueous solution has been applied to the paper as indicated above, the treated product is subsequently dried to effect cure. The drying may be accomplished by merely rolling or squeezing off the excess solution and then setting out in the air to dry or by using forced air. Temperatures used in the drying may vary from about room temperature, e.g., about 20° C. to 100° C. The period of drying will depend largely on the amount of pick-up and concentration of the polymer solution. In most instances, drying periods of from about 1 to 30 minutes should be sufficient.

Any type of paper may be treated according to the process of the invention. Examples of such paper include, for example, those prepared from wood, cotton, linen, hemp, jute, mulberry, straw, bamboo, cane and agave fibers or mixtures thereof, by any of the known processes such as the sulfate process, soda process and sulfite process. The paper may be colored or white and may be further treated for special applications.

The paper treated according to the above may be used for a variety of applications, such as facial tissue, hand towels, maps, filing cards, construction paper, wrapping paper, containers and the like. Because of its resistance to hydrolysis and relative non-toxic nature, the paper is particularly suited for use in preparing wrapper or containers for food.

Certain solvent-soluble derivatives of the above-described new high molecular weight polymers may be prepared by a variety of methods. They may be prepared, for example, by adding the solid polymer particles to a liquid medium containing a swelling agent, such as benzene, phenol and the like, an acid catalyst, such as p-toluenesulfonic acid, and a reactive diluent, such as an aliphatic or cycloaliphatic alcohol, such as methanol, ethanol, ethylene glycol, hexylene glycol, 1,5-pentanediol and the like. The amount of polymer added will generally vary from about 1 to about 50 parts of polymer per 100 parts of solvent and swelling agent. The amount of catalyst employed will generally vary from about .1% to 5% by weight of the total solution. The amount of the swelling agent will vary from about 2 to 200 parts per 100 parts of the polymer. The amount of the reactive diluent employed will depend upon the degree of solubility and molecular structure change desired. If, for example, it is desired to convert all of the theoretical aldehyde groups to acetal groups, an excess over the theoretical amount of diluent needed to effect this change should be employed. In most cases, the amount of diluent employed will vary from about 10 parts to 1000 parts per 100 parts of the polymer.

Stirring and heating may be employed to assist in the formation of the solvent-soluble derivatives. In most cases, temperatures varying from about 20° C. up to and including reflux temperatures of the solution may be employed.

The solvent-soluble polymer derivative may be recovered by any suitable means, such as precipitation, extraction, distillation and the like.

The solvent-soluble derivatives are in most cases substantially white to light colored solids having substantially the same molecular white as the basic insoluble polymer.

Solvent soluble derivatives of the polymer may be used in the preparation of moldings, coatings, and impregnating solutions. The solvent soluble products may also be used as viscosity index improvers for various fluids, such as brake fluids and lubricating oil compositions.

To illustrate the manner in which the invention may be carried out, the following examples are given. It is to be understood, however, that the examples are for the purpose of illustration and the invention is not to be regarded as limited to any of the specific materials or conditions recited therein.

*Example I*

This example illustrates the preparation of a copolymer of acrolein and 2-vinylpyridine, a water soluble derivative thereof and the use of the derivative for treating paper.

To a glass reaction vessel were added the following components in the order indicated: 95 parts of water, 0.2 part of nonylphenol-ethyleneoxide adduct, 0.2 part of 0.1 N hydrochloric acid, 0.5 part of a polyacrolein sulfur dioxide adduct, 12.5 parts of acrolein, 12.5 parts of 2-vinylpyridine, and 5.25 parts of an 0.05 molar solution of tertiary butyl hydroperoxide. The peroxide solution was added dropwise over a period of 30 minutes. The above mixture was stirred and kept at 22 to 28° C. for 24 hours. The reaction mixture was then filtered and a light yellow solid recovered. The resulting product was identified as a copolymer containing about 50% by weight of acrolein and 50% by weight of 2-vinylpyridine. The polymer was insoluble in sodium hydroxide but dissolved in aqueous sulfur dioxide.

The sulfur dioxide solubilized polymer could be cast to form a film which on evaporation was hard and tack free. A 2% water solution of the sulfur dioxide solubilized copolymer was prepared and sheets of bleached sulfite paper were passed into and through the solution. The treated sheets were then allowed to dry at room temperature. The resulting product had the appearance, feel and flexibility of the untreated paper, but demonstrated improvement in fold endurance and wet strength.

*Example II*

This example illustrates the preparation of a copolymer of about 80% acrolein and 20% 2-vinylpyridine, water soluble derivatives thereof and the use of the water soluble derivatives for the treatment of paper.

To a glass reactor were added the following components in the order indicated: 95 parts of water, 2.5 parts of nonylphenolethyleneoxide adduct, 0.1 N hydrochloric acid to make pH 7, 0.5 part of a 6.3% solution of a polyacrolein-$SO_2$ adduct, 20 parts of acrolein, 5 parts of 2-vinylpyridine and 5.2 parts of 0.5 M solution of tertiary butyl hydroperoxide. The peroxide solution was added dropwise during a period of 30 minutes. The resulting mixture was stirred and kept at 22 to 28° C. for 24 hours. The reaction mixture was then filtered to recover a light yellow solid polymer. This solid was identified as a copolymer of 80% acrolein and 20% vinylpyridine. The product was insoluble in sodium hydroxide, but soluble in aqueous sulfur dioxide and sodium bisulfite.

The sulfur dioxide solubilized polymer was cast to form a film which on evaporation was hard and tack free. A 2% water solution of the sulfur dioxide solubilized copolymer was prepared and sheets of bleached sulfite paper passed into and through the solution. The treated sheets were then dried at room temperature. The resulting product had the appearance of the untreated paper, but demonstrated good fold endurance and improvement in wet strength.

*Example III*

The preceding example was repeated with the exception that the acrolein and 2-vinylpyridine were combined in the ratio of 17 parts acrolein and 8 parts vinylpyridine. A copolymer having related properties was obtained.

*Example IV*

This example illustrates the preparation of a copolymer of acrolein and N-vinylpyridine.

To a glass reactor were added the following components in the order given: 95 parts of water, 0.5 part of nonylphenol-ethyleneoxide adduct, 0.1 N HCl to make pH 7, 0.5 part of a 6.3% polyacrolein-$SO_2$ adduct, 80 parts of acrolein, 20 parts of N-vinylpyridine and 5.2 parts of an 0.5 M solution of tertiary butyl hydroperoxide. The peroxide was added dropwise over a period of 30 minutes. The resulting mixture was then stirred and kept overnight at room temperature. The reaction mixture was then filtered to recover a solid product. The product was identified as a copolymer containing about 80% acrolein and 20% N-vinylpyridine. The product was insoluble in sodium hydroxide and soluble in aqueous sulfur dioxide. A water solution of the $SO_2$ adduct was used to treat paper as in the preceding example. The resulting product had good strength and fold endurance.

*Example V*

Example IV was repeated with the exception that N-vinylpyridine was replaced with N-vinyl-2-pyrrolidone. Related results are obtained.

*Example VI*

Example IV was repeated with the exception that the vinylpyridine was replaced with methacrylamide. Related results are obtained.

*Example VII*

Example I was repeated with the exception that the proportions were changed to 95 parts acrolein-5 parts 2-vinylpyridine; 75 parts acrolein-25 parts 2-vinylpyridine; 60 parts acrolein-40 parts 2-vinylpyridine. Related results are obtained.

*Example VIII*

Example IV was repeated with the exception that the vinylpyridine was replaced with each of the following: beta-diethylaminoethyl methacrylate; N-(beta-vinyloxyethyl)formamide, N-butanol methacrylamide and N-octadecyl methacrylamide. Related results are obtained.

*Example IX*

1 part of the copolymer prepared as in Example II is mixed with 40 parts of methanol, 160 parts of ethyl dichloride and .2 part of p-toluenesulfonic acid and the mixture stirred together. In a short while, the copolymer dissolved. Evaporation of the solution gives a solid acetal derivative. The polymeric acetal could be molded at 250° C. to give a hard plastic molding.

Related results are obtained by replacing the methanol in the above with equivalent amounts of each of the following: ethanol, butanol, cyclohexanol and octyl alcohol. Polymeric acetal derivatives are obtained in each case.

*Example X*

400 parts of a saturated sodium chloride aqueous solution containing 0.8 part of acetic acid were charged to a glass reaction vessel equipped with thermometer and stirrer. To this was added 1.25 parts of 4-vinylpyridine. 100 parts of acrolein were added and then 2.0 parts of $K_2S_2O_8$. The mixture was then kept at room temperature to 48° C. for about 6 hours. The resulting slurry was then filtered and washed. The product was identified as a copolymer of acrolein and 4-vinylpyridine containing about 1% vinylpyridine. Carbon 56.2%, nitrogen 0.24% and hydrogen 7.9%. The copolymer had an intrinsic viscosity of 0.32 dl./g.

The above-described copolymer was dissolved in aqueous sulfur dioxide to form a soluble $SO_2$-adduct. This adduct was used to form a 1% and 2% aqueous solution which was used to treat paper as shown in Example I. The results are shown below in comparison to the results obtained by using an $SO_2$ adduct of straight polyacrolein:

| Polymer in treating solution | Concentration, percent | Bursting strength, wet |
|---|---|---|
| $SO_2$ adduct of above-described copolymer acrolein-4-vinylpyridine | 1 | 5.6 |
| Do | 2 | 6.0 |
| Polyacrolein-$SO_2$ adduct | 1 | 2.5 |
| Do | 2 | 3.6 |
| Control | | <0.25 |

The above clearly demonstrates the unexpected improvement in wet strength imparted by the adducts of the new acrolein-vinylpyridine copolymers.

The above procedure was repeated with the exception that the proportions of acrolein and 4-vinylpyridine were changed to 100 parts of acrolein and 4, 5 and 10 parts of 4-vinylpyridine. Related results are obtained.

The invention claimed is:

1. A high molecular weight water-insoluble copolymer of acrolein and a vinyl pyridine, said copolymer having an intrinsic viscosity of at least 0.3 dl./g., as determined on the water-solubilized form by polyelectrolyte viscosity measurements at 25° C.

2. A high molecular weight water-insoluble copolymer of acrolein and a vinyl pyridine, said copolymer having an intrinsic viscosity between 0.3 dl./g. and 5.0 dl./g., as determined on the water-solubilized form by polyelectrolyte viscosity measurements at 25° C.

3. A water-insoluble copolymer of acrolein and 2-vinyl pyridine wherein the polymerized acrolein makes up from 5% to 99% by weight of the copolymer, said copolymer having an intrinsic viscosity between 0.3 dl./g. and 5.0 dl./g. as determined on the water-solubilized form by polyelectrolyte viscosity measurements at 25° C.

4. A water-insoluble copolymer of acrolein and a vinyl pyridine wherein the polymerized acrolein makes up from 5% to 99% by weight of the copolymer, said copolymer having an intrinsic viscosity between 0.3 dl./g. and 5.0 dl./g. as determined on the water-solubilized form by polyelectrolyte viscosity measurements at 25° C.

5. A copolymer defined in claim 1 substituted with at least one member of the group consisting of sulfonic acid groups and water-soluble salt sulfonate groups, said substituted polymer being soluble in water.

6. A water-soluble adduct of the copolymer defined in claim 1 and sulfur dioxide.

7. A water-soluble adduct of the copolymer defined in claim 1 and sodium bisulfite.

8. A process for preparing paper having improved wet strength which comprises applying an aqueous solution of a water-soluble sulfur-dioxide containing adduct of a copolymer of acrolein and a vinyl pyridine, to paper sometime during the production of the paper from paper pulp up to and including the finished paper, and then drying the treated paper at a temperature between about 20° C. and 100° C., the said copolymer prior to formation of the adduct being insoluble in water and having an intrinsic viscosity of at least 0.3 dl./g., as determined on the water-solubilized form by polyelectrolyte viscosity measurements at 25° C.

9. A process for treating paper to improve the wet strength thereof which comprises impregnating the paper with an aqueous solution of a sodium bisulfite adduct of a copolymer of acrolein and a vinyl pyridine, and drying the resulting treated paper at a temperature of about 20° C. to 100° C., said copolymer prior to formation of the adduct being insoluble in water and having an intrinsic viscosity of at least 0.3 dl./g., as determined on the water-solubilized form by polyelectrolyte viscosity measurements at 25° C.

10. A process for producing wet strength paper having improved properties which comprises adding an aqueous medium containing a sodium bisulfite adduct of a copolymer of acrolein and a vinyl pyridine to an aqueous suspension of paper pulp at the beater stage, forming paper from the resulting product, and drying the formed paper at a temperature between about 20° C. and 100° C., said copolymer prior to formation of the adduct being insoluble in water and having an intrinsic viscosity of at least 0.3 dl./g., as determined on the water-solubilized form by polyelectrolyte viscosity measurements at 25° C.

11. A process as in claim 10 wherein the polymer is a sulfur dioxide solubilized copolymer of acrolein and 2-vinylpyridine.

12. A process as in claim 10 wherein the polymer is a sodium bisulfite solubilized copolymer of acrolein and N-vinylpyridine.

References Cited by the Examiner

UNITED STATES PATENTS

| | | | |
|---|---|---|---|
| 2,657,192 | 10/1953 | Miller et al. | 260—73 |
| 2,929,710 | 3/1960 | Martin | 260—73 |
| 3,036,978 | 5/1962 | Kern et al. | 260—73 |
| 3,079,296 | 2/1963 | Houff et al. | 162—168 |
| 3,079,357 | 2/1963 | Fischer | 260—29.6 |
| 3,084,992 | 4/1963 | Schlack et al. | 260—73 |
| 3,121,700 | 2/1964 | Bergman | 260—29.6 |

FOREIGN PATENTS 1,071,339  12/1959  Germany.

OTHER REFERENCES

Schulz et al.: Makromal Chem. 24, 141–151 (1957).

WILLIAM H. SHORT, *Primary Examiner.*

MILTON STERMAN, NORMAN G. TORCHIN, LOUISE P. QUAST, *Examiners.*